(No Model.)
C. GROTZ.
COAL DRILL.
No. 500,124. Patented June 27, 1893.
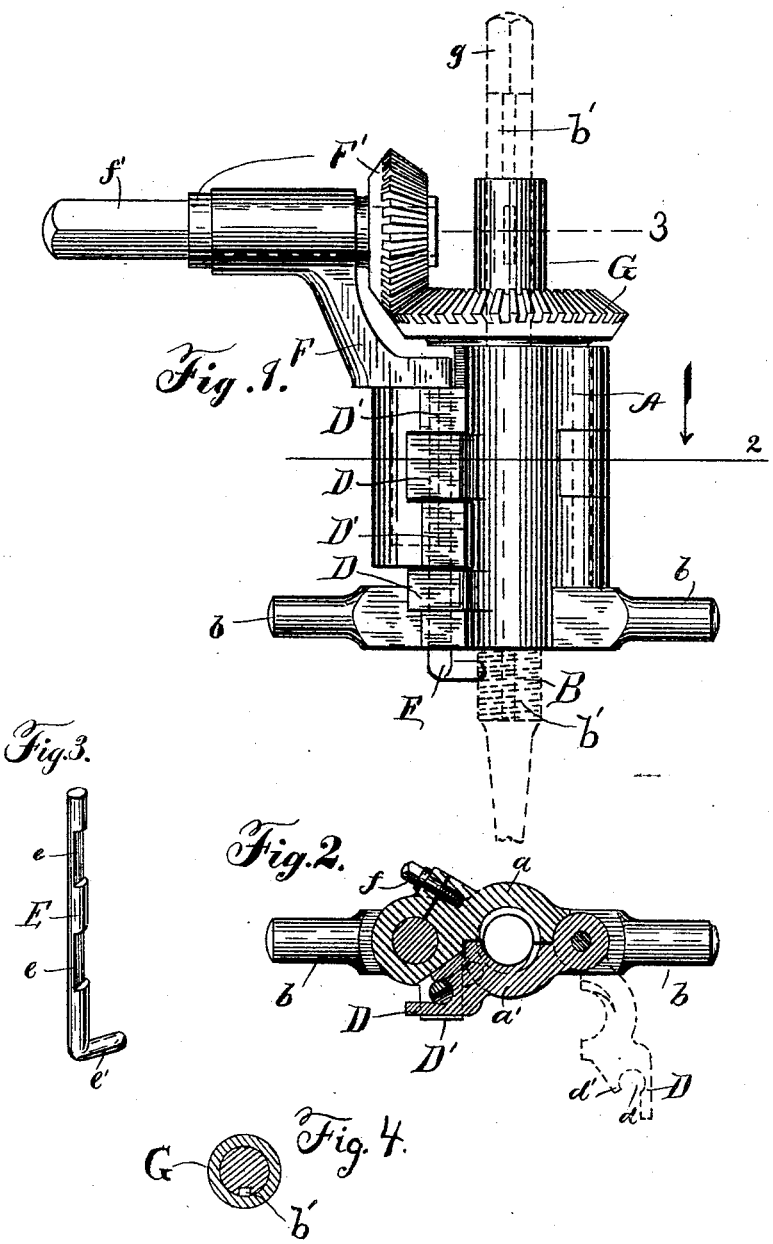
Witnesses.
Thos. F. Sheridan
Annie C. Courtenay
Inventor.
Charles Grotz
By Banning and Banning and Payson,
Attorneys.

UNITED STATES PATENT OFFICE.

CHARLES GROTZ, OF OTTUMWA, IOWA, ASSIGNOR TO THE HARDSOCG MANUFACTURING COMPANY, OF SAME PLACE.

COAL-DRILL.

SPECIFICATION forming part of Letters Patent No. 500,124, dated June 27, 1893.

Application filed July 29, 1892. Serial No. 441,587. (No model.)

*To all whom it may concern:*

Be it known that I, CHARLES GROTZ, a citizen of the United States, residing at Ottumwa, Iowa, have made certain new and useful Improvements in Coal-Drills, of which the following is a specification.

In the drawings, Figure 1 is a plan view of my improved coal drill. Fig. 2 is a transverse section taken in the line 2 of Fig. 1, looking in the direction of the arrow. Fig. 3 is a perspective view of a cam locking pin hereinafter described, and Fig. 4 a transverse section on line 3 of Fig. 1.

In making my improved coal drill, I make a nut, A, provided with a screw-threaded hole through it, in which the drill, B, provided with corresponding threads, works as it is advanced for drilling purposes. The screw threads of the nut and drill may of course be arranged at any desired pitch to advance the drill with the desired speed.

In order to facilitate the removal of the drill after it has penetrated into the body of the coal a desired distance, without having to reverse its motion of rotation and wait until it has been retracted by the screw threads, I make the nut in two parts—a main part $a$ and a hinged part $a'$—hinged together on a longitudinal pin C, so that by swinging the pivoted or hinged portion of the nut back, the drill may be lifted up enough to disengage the screw threads, when it may be immediately withdrawn. Of course, when in working condition the hinged portion of the nut must be locked or held in secure engagement with the main portion, so as to form a screw-threaded hole through which the drill advances. In Fig. 2 I have shown it in its locked or closed position in full lines, and in its unlocked or open position in dotted lines.

To secure or lock the two parts of the nut together, I make a cam locking pin E, which may be cylindrical in those portions of it which rest in the lugs or bearings D', forming a part of the main portion of the nut. Between these lugs the pin is cut away, as at $e$, where it passes through the lugs D, so as to remove about one half of its body. The pin is provided with a handle or turn $e'$ at the end, to enable it to be rotated. It is intended to remain constantly in its bearings, and when it is desired to unlock or open the nut, it is turned around about ninety degrees, so that the hole $d$ in the lugs D of the hinged portion of the nut—which holes are made open in my invention as shown in dotted lines in Fig. 2—cease to be engaged by the pin, and thus permit the hinged portion of the nut to be turned back as shown at dotted lines in Fig. 2, when the drill may be removed. When it is desired to lock the two portions of the nut together, the pin is turned or held in that position which will enable the holes $d$ to pass over it through the spaces $e$ formed, as above said, by cutting away the body of the pin. When it has passed far enough, the pin may be rotated, when its edge will engage with the edge $d'$ of the holes, and act as a cam to force the hinged portion of the nut down into position, thus crushing pieces of coal that otherwise would prevent the closing of the nut.

When in operation the drill is intended to be supported on a frame, and to that end is provided with trunnions $b$. I have shown two ways of operating the drill. In one of these ways I provide the main portion of the nut with another longitudinal hole, additional to the drill hole, in which the shaft of a bracket F is placed and held, so that it may be adjusted longitudinally. To hold it in place I prefer to make the hole with a spring side, so that it can be tightened around the shaft by a screw $f$, as shown in Fig. 2. The outer end of the bracket is provided with a shaft, carrying a pinion F', on the outer end of which shaft a crank may be arranged as at $f'$, to enable it to be rotated.

A collar and pinion G are mounted on the drill, which is feathered to the collar so as to be rotated, but permitted to advance through its engagement with the screw threads by means of the key or feather $b$ easily fitting in the groove $b'$; and the teeth of pinion G are in mesh or engagement with the teeth of pinion F, so that as such pinion is rotated, the drill will be rotated and caused to advance. In some cases, however, this arrangement is impracticable, owing to the contracted space in which the drill is intended to be operated. In such cases, I remove the bracket F and pinion F', by loosening the screw $f$, and place the crank directly on the end of the drill, as at g, so that it may be rotated immediately and without the intervention of other parts.

What I regard as new, and desire to secure by Letters Patent, is—

In a coal drill, the combination of a nut comprising a main portion and a hinged portion provided with interlapping lugs the one having full and the other open holes, and a cam locking pin passing through such holes and locking the parts together when in one position and unlocking them when partially rotated, substantially as described.

CHAS. GROTZ.

Witnesses:
W. A. WORK,
C. M. WARREN.